United States Patent [19]
Sargent

[11] Patent Number: 5,524,867
[45] Date of Patent: Jun. 11, 1996

[54] DRIFT GAUGE ROD PUSHING DEVICE

[75] Inventor: William B. Sargent, Birmingham, Ala.

[73] Assignee: USX Corporation, Pittsburgh, Pa.

[21] Appl. No.: 330,379

[22] Filed: Oct. 27, 1994

[51] Int. Cl.$^6$ ................................................ E21B 19/00
[52] U.S. Cl. ............................................................. 254/29 R
[58] Field of Search .................................. 254/29 R, 30, 254/31, 132; 29/252, 282, 283

[56] References Cited

U.S. PATENT DOCUMENTS

| | | |
|---|---|---|
| 4,000,879 | 1/1977 | Martin et al. . |
| 4,251,058 | 2/1981 | Schosek .............................. 254/29 R |
| 4,434,969 | 3/1984 | Von Ruden . |
| 4,492,274 | 1/1985 | Schosek . |
| 4,976,483 | 12/1990 | Cunningham . |
| 5,052,659 | 10/1991 | Bates . |
| 5,208,967 | 5/1993 | Beard . |

Primary Examiner—Robert C. Watson
Attorney, Agent, or Firm—Armstrong, Westerman, Hattori, McLeland & Naughton

[57] ABSTRACT

A drift gauge rod pushing device comprises a base, a frame mounted on the base and extending into the pass line of a powered drift gauge rod. The frame has a slot in which is mounted a pin supporting the top ends of a pivoted front plate and a back plate in a manner such that the plates can slidably move within the slot. The back plate is biased by a first spring means and a second spring means holds the front plate at an angle to the pass line in a rest position. An hydraulic cylinder/piston assembly moves the plates away from and toward a casing to be gauged. Each of the plates has an aperture in the pass line, that in the front plate is at an angle to the pass line such that, when the front plate is pivoted toward a vertical position, the edges of the aperture therein grip the drift gauge rod and apply a bending moment thereto to dislodge a stuck drift gauge.

5 Claims, 1 Drawing Sheet

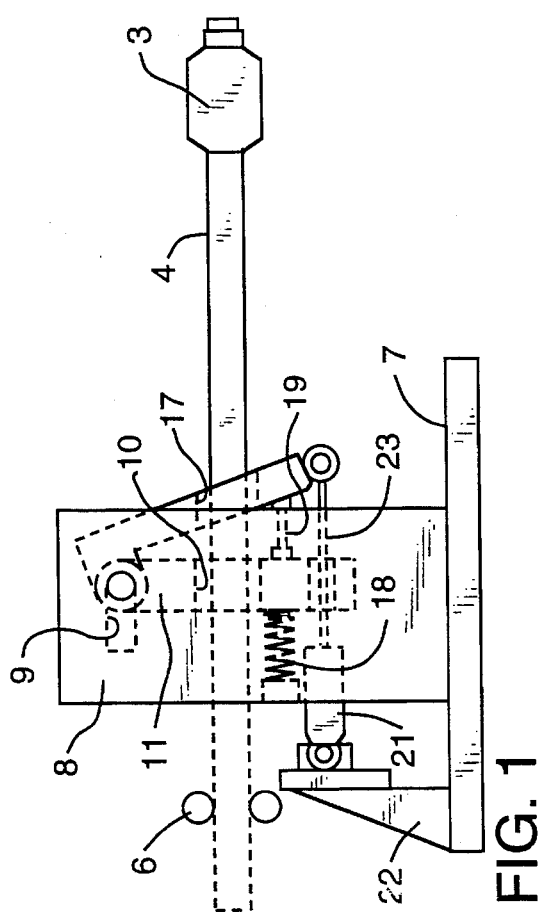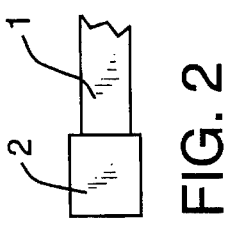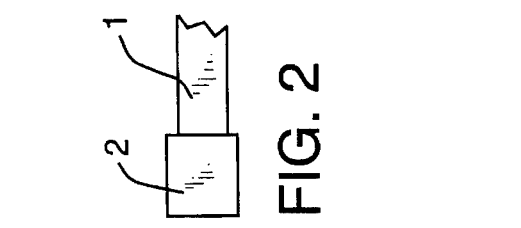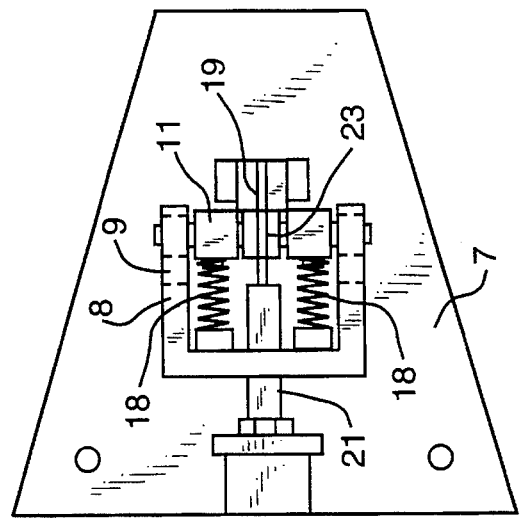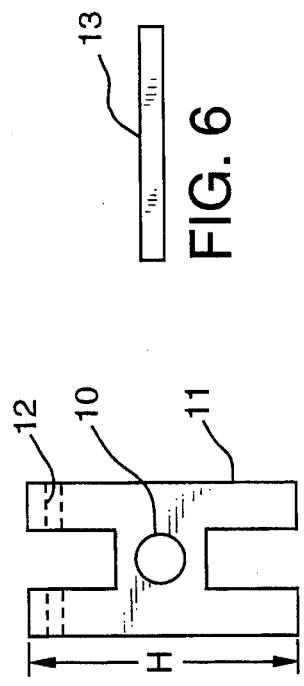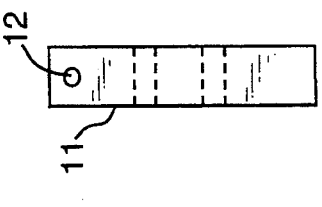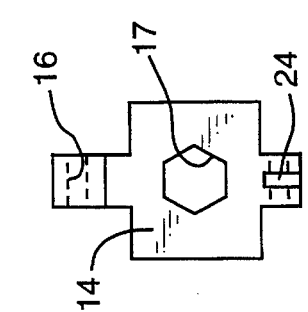

DRIFT GAUGE ROD PUSHING DEVICE

BACKGROUND OF THE INVENTION

1. Field of the Invention

This invention relates to apparatus and methods for removing drift gages, or plugs, which have become stuck in pipe or couplings the internal diameter of which is being measured by, the drift gage or plug.

2. Description of Related Prior Art

American Petroleum Institute (A.P.I.) specifications require that all oil country tubular casing, and couplings if attached to the casing, be gauge drifted with a unique drift gauge in order to insure uniform internal diameter oft he casing and couplings. When an internal protrusion, or piece of scale, or other interference with the movement of the drift gauge is encountered, the gauge becomes lodged in the casing or coupling. This sticking is a frequent occurrence and the accompanying difficulties of breaking the stuck gauge causes much down time and expense in the manufacture of casing and couplings.

The drift gauge normally is propelled into and out of a casing by a mechanical drive attached to a powered drift gauge rod on which the drift gauge is carried. The mechanical drive and associated powered drift gauge rod is purposely underdesigned (underpowered) to simulate the hand drifting or gauging which occurs in the field. Another factor which causes sticking of a drift gauge to occur is that the powered drifter mechanical drive must operate at line speed to accommodate a definite production rate, and it is this speed, along with the drift gauge inertia, which lodges the drift gauge in a defective casing or coupling.

U.S. Pat. No. 5,208,967 discloses apparatus for extracting tubes, such as condenser and heat exchanger tubes, from their mountings, and includes a cylindrical gripping collar which has an internal dimension slightly larger than a tube to be extracted. The gripping collar is tiltable and, when tilted, the edges of the collar grip the tube and, when a longitudinal force is exerted on the collar, it extracts the tube from its mounting.

U.S. Pat. Nos. 5,052,659 and 4,976,483 relate, respectively, to a stake puller and a stake driving tool. Each comprises an element with an aperture or slot the edges of which, in a tilted position, grips a stake to be pulled or driven.

U.S. Pat. Nos. 4,492,274, 4,434,969 and 4,000,879 each describes a rod or pipe puller or pusher having a hollow member the edges of which, in a tilted position of the member, grip a rod or pipe to be pulled or pushed through the ground.

SUMMARY OF THE INVENTION

In accordance with the invention, an apparatus to dislodge a stuck drift gauge (hereinafter called a "sticker remover" or drift gauge rod pushing device) is provided comprising a base on which is mounted a frame or yoke in the pass line of the powered drift gauge rod. One end of an apertured first or back plate is mounted on the frame and is slidable in a slot in the frame with the drift gauge rod extending through the aperture in the back plate. An upper end of a second or front plate is pivotally mounted on the frame for similar sliding movement within the slot and pivotally movable into and out of engagement with the back plate. A set of first, relatively heavy, springs have one end bearing on the frame and the other end bearing on the back plate so that, in a fully extended position of the first springs, the back plate is in a vertical position. A second, relatively lighter, spring bears at one end on a front surface of the back plate and, at the other end, is attached to a back surface of the front plate so that, in a rest position of the sticker remover apparatus, the front plate is held out of contact with the back plate and at an angle to the pass line of the powered drift rod. The front plate has an aperture, at an angle to the horizontal and through which, in the rest position, the powered drift rod extends. An hydraulic cylinder/piston assembly is mounted on the frame, with the free end of the piston attached to a lower end of the front plate in such manner that, on actuation of the cylinder/piston assembly, the front plate pivots backwardly against the back plate and the two plates move together backwardly within the slot in the frame, and the edges of the aperture in the front plate grip the powered drift rod and exert a bending moment thereon to dislodge a stuck drift gauge.

BRIEF DESCRIPTION OF THE DRAWINGS

FIG. 1 is a side elevational view of the drift gauge sticker remover of the invention;

FIG. 2 is a side elevational view of a casing and attached couplings internal dimensions of which are to be measured by the drift gauge;

FIG. 3 is a top plan view of the drift gauge sticker remover of FIG. 1;

FIG. 4 A is a front elevational view of the back plate;

FIG. 4 B is a side elevational view of the back plate;

FIG. 5 A is a front elevational view of the front plate;

FIG. 5 B is a side elevational view of the front plate, and

FIG. 6 is a side elevational view of a pin for mounting the top ends of the front and back plates in the slot in the frame.

DESCRIPTION OF PREFERRED EMBODIMENTS

FIGS. 1 and 2 show the sticker remover apparatus of the invention and a casing 1 and attached coupling 2 the internal dimensions of which are to be determined by a drift gauge 3. Gauge 3 is mounted on the end of a powered drift rod 4, which is driven by a mechanical drive mechanism shown schematically at 6.

On a base 7 there is mounted a frame or yoke 8 having a slot 9 near an upper end of the frame. Slot 9 may have a length, for example, of about 4 inches. As detailed in FIGS. 4A and 4B, an H-shaped back plate 11 has holes 12 for reception of a pin 13 by means of which back plate 11 is mounted in the slot 9 for sliding movement therein. Back plate 11 has an aperture 10 through which, as shown in FIG. 1, drift rod 4 extends. As detailed in FIGS. 5A and 5B, an L-shaped front plate 14 has a hole 16 for reception of the pin 13 for sliding movement of the plate 14 in the slot 9. Front plate 14 has an aperture 17 inclined at an angle, e.g. about 25 degrees from the horizontal, through which, in a rest position as shown in FIG. 1, the drift rod 4 extends. Front plate 14 and back plate 11 may have a height, H, for example, of about 11¼ inches.

A set of first springs 18 bear, at one end thereof, against the frame 8 and, at the other end, against back plate 11. Springs 18 have a length, e.g. of about 4 inches, such that, in the fully extended condition of the springs, back plate 11 is in a vertical position. Springs 18 are relatively heavy carbon steel springs, for example, having an outside diameter of about 2½ inches and an inside diameter of about 1 inch and have about 2 to 2½ turns per inch. A second, relatively lighter, spring 19 is provided, having one end connected to a front face of the back plate 11 and the other end connected to a back face of the front plate 14. Spring 19 may be a carbon steel spring, of length about 8 inches, having an outside diameter of about 1¼ inches and an inside diameter of about 1 inch, and 4 turns per inch. Spring 19 serves to hold the front plate 14 in a forward position, spaced from the back plate 11, at an angle to the pass line of drift rod 4 in a rest position of the sticker remover apparatus.

A Cylinder 21 is mounted on a stanchion 22 on base 7 and an associated piston 23 has the free end thereof connected to the front plate 14, as by a pin (not shown) extending through hole 24 in the lower end of the front plate 14. Upon actuation of the cylinder 21, front plate 14 is drawn backwardly toward the back plate 11 against the force of second spring 19, and the two plates then move together, in slot 9, against the force of the first springs 18, to a clamped position as shown in FIG. 3. Thereupon, the edges of the inclined aperture 17 in front plate 14 grip the drift rod 4 and apply to it a bending moment which forces the drift rod 4 to be pulled toward the drift gauge remover apparatus and dislodges a stuck drift gauge 3. After such dislodgement, which may require at little as ⅛ inch movement of the drift rod 4 under the influence of the thus-applied bending moment, the cylinder/piston assembly returns the apparatus to the rest position as shown in FIG. 1, in which position the mechanical drive 6 can pull the drift rod 4 and drift gauge 3 out of the casing and coupling.

The edges of the aperture 17 in front plate 14 are subjected to heavy wear conditions. Therefore, aperture 17 may be provided with a replaceable, wear-resistant bushing.

Studies have shown that as much as 50% of operating delays in the drift measurement of casing and couplings in one plant are attributable to a lodged drift gauge. Prior to the present invention, removing drift stickers involved striking the drifter rod with a sledge hammer, or using a smaller pipe supported by an overhead crane and installed into the defective casing to act as a battering ram to break the lodged drift gauge free. Such crude and time-consuming methods can be eliminated by use of the drift gage sticker remover as above described.

What is claimed is:

1. A drift gauge rod pushing device comprising a base, a frame mounted on the base and extending above the base into a pass line of a powered drift rod which carries a drift gage at one end thereof, said frame being provided with an elongated slot extending parallel to the drift rod pass line, a gripping plate pivotally mounted at a top end thereof by means of a pin extending through a hole in the gripping plate and into the slot in the frame so that the gripping plate can pivot and slidably move within the slot, the gripping plate being provided with an aperture in the pass line of the drift rod and at an angle thereto, a first spring means bearing on a lower end of the gripping plate and holding the gripping plate at an angle to the pass line in a rest position of the sticker remover, and means to move the gripping plate slidably within the slot and pivotally into a substantially vertical position with respect to the pass line whereby edges of the aperture in the gripping plate grip the drift gauge rod and apply a bending moment thereto to dislodge a drift gauge stuck in a hollow casing or coupling the internal dimensions of which are being measured by the drift gauge.

2. A drift gauge rod pushing device according to claim 1, further comprising a back plate mounted on the same pin which holds the gripping plate to the frame and allowing the back plate to slide within the slot, a second spring means bearing at one end against the frame and at the other end against a back surface of the back plate whereby the back plate is in a substantially vertical position when the second spring is fully extended in a rest position, whereby, when the means to move the gripping plate is actuated, the gripping plate moves backward into contact with the back plate and the two plates slidably move together in the slot against the force of the second spring means.

3. A drift gauge rod pushing device according to one of claims 1 or 2, wherein the aperture in the gripping plate is inclined at an angle of about 25 degrees with respect to the drift gauge rod pass line.

4. A drift gauge rod pushing device comprising:

a base;

a frame mounted on the base and extending above the base into a pass line of a drift gauge rod and having an elongated slot near a top of the frame and extending parallel to the drift gauge rod pass line;

a back plate having holes near a top edge thereof by means of which the back plate is mounted on a pin extending into the slot whereby the back plate can slidably move within the slot, the back plate having an aperture therein in the pass line of the drift gauge rod;

a first spring means having one end thereof bearing on the frame and the other end thereof bearing on a back surface of the back plate and of such length that, when the first spring means is fully extended in a rest position of the sticker remover, the back plate is in a substantially vertical position;

a front plate having a hole near a top edge thereof by means of which the front plate is pivotally mounted on the same pin which supports the back plate and whereby the front plate can pivot and slidably move within the slot, the front plate having an aperture in the pass line of the drift gauge rod and inclined at an angle thereto;

a second spring means bearing at one end against a front surface of the back plate and at the other end connected to a lower end of the front plate, whereby, in a rest position of the sticker remover, the front plate is spaced from the back plate and held at an angle to the pass line of the drift gauge rod; and a cylinder/piston assembly in which the cylinder is attached to the frame and a free end of the piston is connected to a lower end of the front plate and adapted, when the cylinder/piston assembly is actuated, to draw the front plate backwardly into contact with the back plate and to move the back plate and the front plate together in the slot against the force of the first spring means, whereby the inclined aperture in the front plate grips the drift gauge rod and applies a bending moment thereto to dislodge a drift gauge stuck in a hollow casing the internal dimensions of which are being measured by the drift gauge.

5. A drift gauge sticker remover according to claim 4, wherein the aperture in the front plate is inclined at an angle of about 25 degrees to the pass line of the drift gauge rod.

* * * * *